Oct. 6, 1970  E. N. PHILLIPS  3,531,876
MODEL POSITIONING AND SUPPORT APPARATUS
Filed April 17, 1968  3 Sheets-Sheet 1

Edwin N. Phillips
INVENTOR.

BY
Attorney

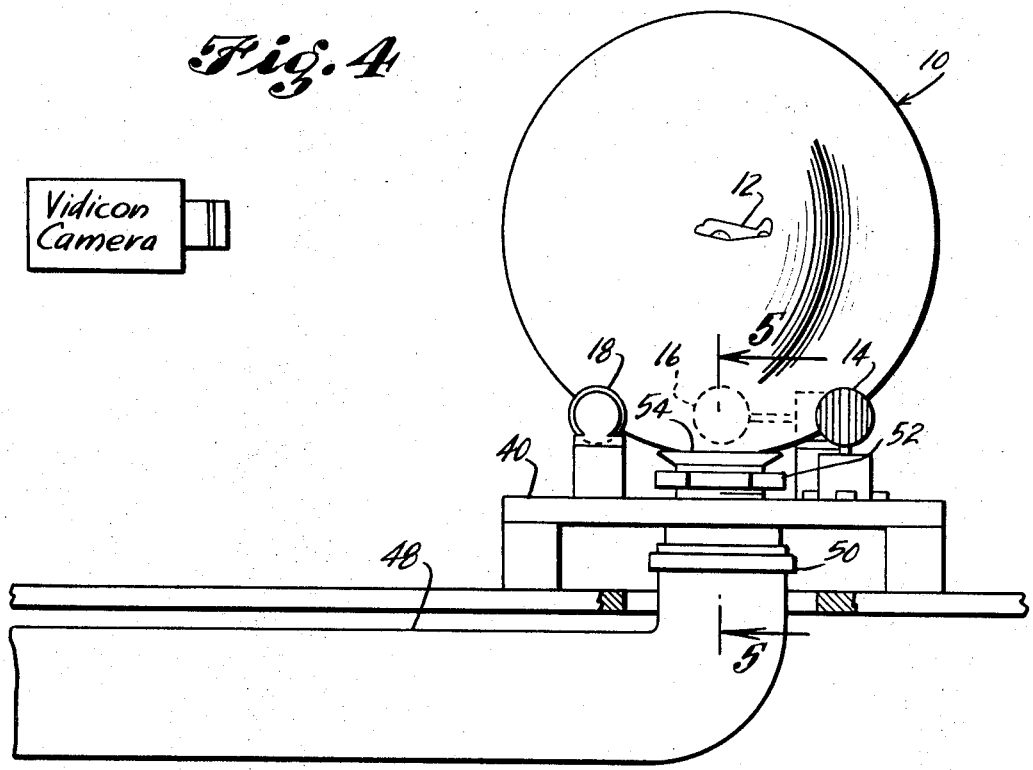
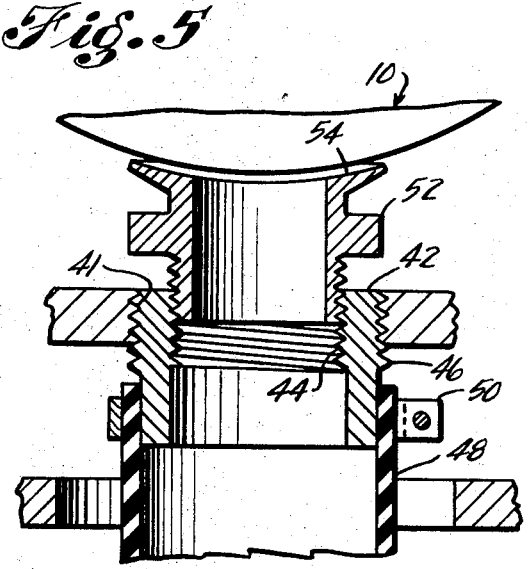

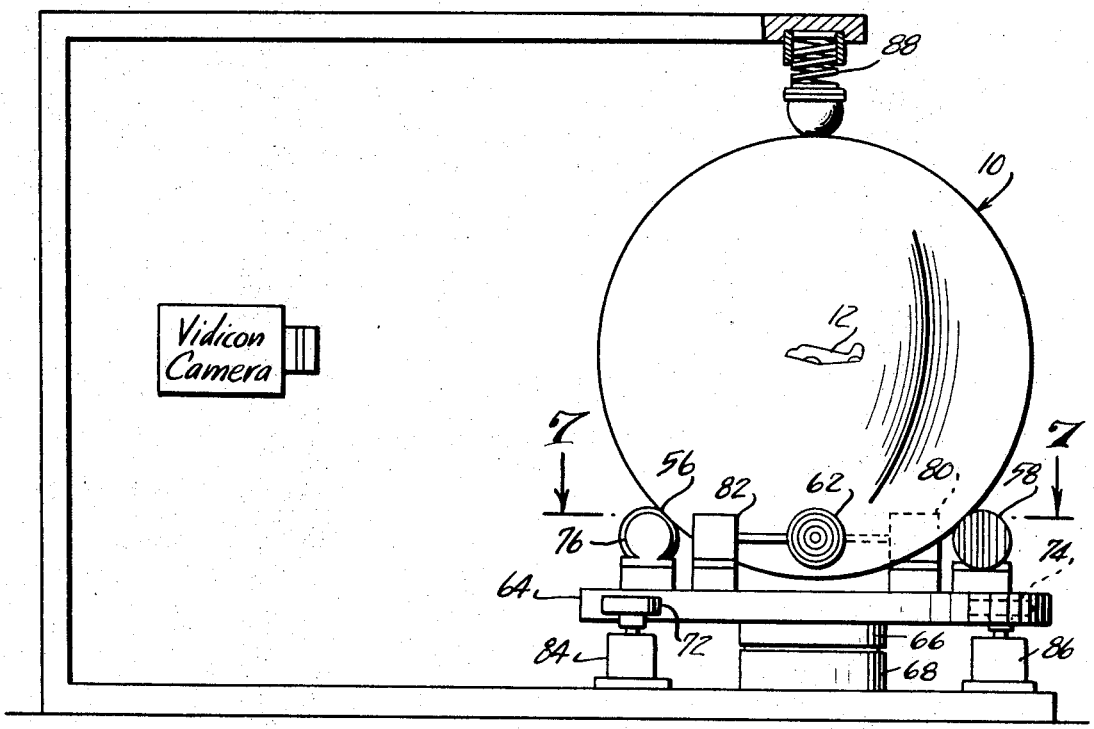
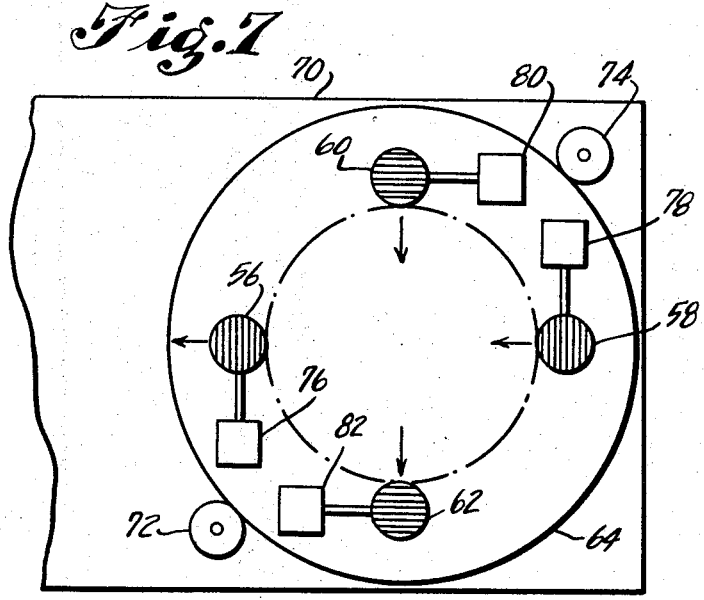

United States Patent Office 3,531,876
Patented Oct. 6, 1970

3,531,876
MODEL POSITIONING AND SUPPORT
APPARATUS
Edwin N. Phillips, Winter Park, Fla., assignor to the
United States of America as represented by the Secretary of the Navy
Filed Apr. 17, 1968, Ser. No. 721,976
Int. Cl. G09b 9/08
U.S. Cl. 35—12
9 Claims

ABSTRACT OF THE DISCLOSURE

A model positioning and support apparatus wherein the model is encased in a spherical mass of transparent material and means are provided to rotate the mass of material selectively in any of three orthogonal directions about the center of said mass to provide three dimensional attitude adjustment of the model while providing the effect of invisible support of the model itself.

---

In the development of visual simulators, and particularly image synthesizers of the electronic type, means must be provided for supporting target models so that no visible means of support are evident.

Ship models have been so supported and positioned that no supporting means are shown to a television camera by shrouding in black felt or velvet the supporting motor mount used to rotate the model in azimuth, and black flocking materials are applied to the surroundings. These measures assure a reflectionless background and only the illuminated model can be seen in a monitoring television type receiver.

However, the support of an aircraft for three dimensional positioning with the same requirement of invisible support presents a problem which is not satisfied by the means described above. While the model itself can be positioned by a triple of semicircular yokes, the difficulty in so shrouding the combination so that only the aircraft target may be seen by the television system has been found insurmountable for practical application.

SUMMARY OF THE INVENTION

In accordance with the subject invention, the difficulties expressed above are eliminated by providing a sphere formed of a clear transparent plastic having imbedded therein at the rotational center thereof the model to be selectively adjusted in attitude and by providing supporting drive means including a support, a plurality of drive rollers mounted on said support to engage the outer periphery of said sphere and drive means for driving said rollers on axes selected to rotate said sphere selectively about three diameters of the sphere, each normal to the other to provide yaw, pitch, and roll movements to said sphere and model.

BRIEF DESCRIPTION OF THE DRAWING

Other objects and advantages will appear from the following description of examples of the invention when considered in connection with the accompanying drawings in which:

FIG. 4 is a side elevational view of a modification of the invention in which suction means are provided to bias a model carrier sphere on its drive rollers;

FIG. 5 is a sectional view taken on the line 5—5 of FIG. 4;

FIG. 6 is a diagrammatic side elevational view of a further modified apparatus also incorporating the invention; and FIG. 7 is a view taken on line 6—6 of FIG. 5.

DESCRIPTION OF THE PREFERRED EMBODIMENT

Figure 1:
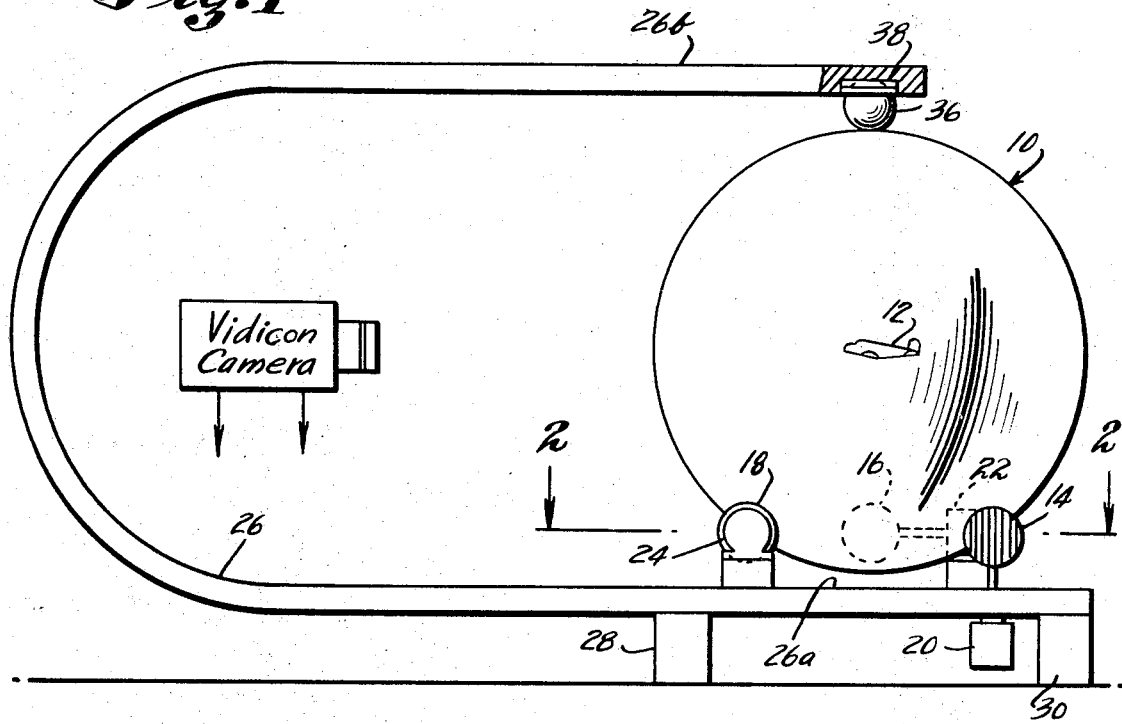
FIG. 1 is a diagrammatic side elevational view of apparatus embodying the invention.
Figure 2:
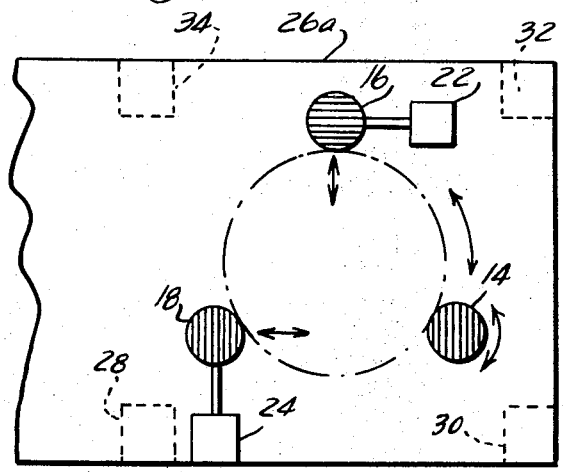
FIG. 2 is a view taken on line 2—2 of FIG. 1.

Referring to the drawings, apparatus incorporating the invention as shown in FIGS. 1 and 2 includes a carrier sphere 10 of completely transparent material such as plastics of the group including polystyrene resins, acrylic resins, urea-formaldehyde resins, alkid resins, and cellulose acetate, in which a model target 12 is imbedded at the center of rotation of the sphere 10. A plastic carrier sphere can be fabricated and the model imbedded therein by any of several conventional processes. One process employs a spherical mold into which enough plastic material and catalyst in liquid form is poured to half fill the mold, and upon partial setting of the material the model is positioned in the plastic and then additional plastic in liquid form is added to completely form the sphere. Parting lines on the sphere are polished to a smooth finish.

The model 12 itself may be of a material including metal or plastic of higher melting point than the sphere plastic and could represent, for example, an airplane as shown at 12 in FIG. 1. Assuming a plane wingspread of 100 feet and a 1 to 1200 scale reduction in the model, the model will have a 1-inch tip to tip wing span. A suitable carrier sphere for such model could be four inches in diameter.

To provide for rotation of the sphere 10 to adjust the attitude of the model 12, the sphere is positioned on three drive rollers 14, 16, and 18, each rotatable on an axis normal to the other two and each engaging the outer periphery of the sphere 10. Rollers 14, 16, and 18 are driven respectively by motors 20, 22, and 24 mounted on the bottom portion 26a of a resilient C-shaped frame support 26 which in turn is provided with supporting feet 28, 30, 32, and 34, as indicated in FIGS. 1 and 2.

To forceably bias the sphere 10 against the rollers 14, 16, and 18, an idler roller 36 is mounted in the upper portion 26b of frame 26 by a bearing indicated at 38.

In the arrangement of FIGS. 1 and 2 described above, the sphere 10 is adjusted by the rollers 14, 16, and 18 to provide three dimensional attitude adjustment of the model 12, such that a vidicon camera, indicated, may take unobstructed pictures of the model in visually unsupported and adjustable attitude. Rollers 14, 16, and 18 respectively provide yaw, pitch, and roll adjustment of model attitude.

Figure 3:
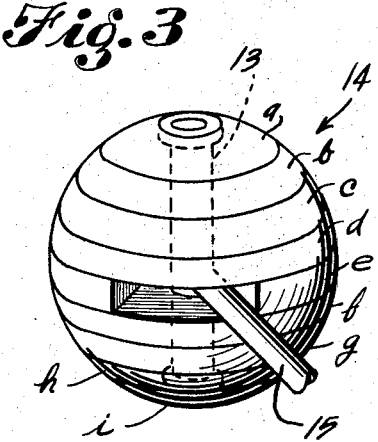
FIG. 3 is a perspective view of a preferred drive element used in the apparatus of FIG. 1.

Also in accordance with an aspect of the invention, the rollers are formed of a plurality of articulated spiroidal sections rotatable on a common crosshead axle to prevent scuffing of one roller on the sphere 10 when another roller is in driving condition. Thus, as shown in FIG. 3, roller 14 is formed of sections a through i, each rotatable on a common crosshead axle 13 to which the drive shaft 15 is fixed. The center section e is formed as a partial section to provide for limited rotation while admitting the shaft 15 to the crosshead 13. In drive of the roller 14 from the shaft 15 on the sphere 10, the reaction force is in a plane passing through the crosshead 13 such that the segments are not rotated. However, drive from the sphere to the roller 14 responsive to drive to the sphere by either of the rollers 16 or 18 rotates one or more segments instead of causing scuffing on the sphere.

Referring to the modification incorporating the invention and shown in FIGS. 4 and 5, the apparatus is the same as the apparatus of FIGS. 1 and 2 insofar as the model, sphere and drive means is concerned. However, the C-shaped frame is replaced by a flat fixed base 40 apertured and threaded as at 41, and the bias roller 36 of FIG. 1 is replaced by an air suction system to bias the sphere down on the rollers 14, 16, and 18. Any suitable suction system may be employed. One suitable system shown in FIGS. 4 and 5 includes (see FIG. 5) a connection 42 internally threaded as at 44 and externally threaded as at 46, a suction source indicated by a suction pipe 48 clamped as at 50 to the fitting 42, and an inlet nozzle 52 threaded into the fitting 42 and having an inlet end 54 adjacent the bottom of the sphere 10. Threaded adjustment of the nozzle 52 varies the proximity of the nozzle 52 and sphere to adjust the biasing force of the sphere 10 in the drive rollers 14, 16, and 18. In this arrangement the sphere 10 is completely uninhibited by any frame structure such that cameras and lighting (not shown) can be most advantageously positioned.

Referring to FIGS. 6 and 7, the modification shown therein and incorporating the invention is similar to the apparatus of FIGS. 1 and 2 except for the drive means for the sphere 10. In the arrangement of FIGS. 6 and 7, two pairs of drive rollers support the sphere 10. One pair indicated at 56 and 58 provide roll adjustment, and the other pair 60 and 62 provide pitch adjustment. Yaw is provided by a yaw plate 64 rotatably mounted by bearings 66 and 68 on the base of a frame 70. The yaw plate is rotated by drive rollers 72 and 74 mounted on the frame 70 and engaging the yaw plate 64. Rollers 56, 58, 60, and 62 are mounted on the yaw plate to rotate therewith and each of the rollers 56, 58, 60, 62, 72, and 74 are provided respectively with drive motors 76, 78, 80, 82, 84, and 86. Also in this arrangement a spring bias means 88 is provided for bias in place of utilizing the resilience of the frame.

Each of the arrangements described above provides the advantages of (a) a clear visual field for location of a camera about the model, (b) no visual support of the target model since it is supported at every point of its surface by the transparent sphere, (c) illuminating reflectors (not shown) may be located above the sphere and out of the field of the scanning camera, and (d) the carrier sphere can be driven in all three orthogonal directions with no limitations on the amount of rotations. Light from the hooded lights (not shown) enters the sphere surface at right angles so that no difficulty is experienced from the indices of refraction of the air and the transparent sphere.

It will be understood that various changes in the details, materials, and arrangements of the parts, which have been herein described and illustrated in order to explain the nature of the invention, may be made by those skilled in the art within the principle and scope of the invention as expressed in the appended claims.

The invention described herein may be manufactured and used by or for the Government of the United States of America for governmental purposes without the payment of any royalties thereon or therefor.

I claim:
1. A model positioning and support apparatus having three dimensional attitude adjustment of said model, including yaw, pitch, and roll, together with invisible support of the model itself comprising:
  (a) a sphere cast of a clear transparent plastic having imbedded therein at the rotational center thereof a model to be selectively adjusted in attitude,
  (b) supporting drive means including a support, a plurality of drive rollers mounted on said support to engage the outer periphery of said sphere, drive means for driving said rollers on axes selected to rotate said sphere selectively about three diameters of the sphere, each normal to the other to provide yaw, pitch and roll movements to said sphere, and
  (c) said supporting drive means including biasing idler roller means mounted on said support and engaging said sphere to maintain a bias of said sphere on said drive rollers.

2. Apparatus according to claim 1,
  (a) said support including a disc forming a yaw base centrally pivoted for rotation about a central axis thereof corresponding to one diameter of said sphere,
  (b) said drive rollers including a pair of spaced roll drive rollers pivotally mounted on said yaw base in a plane passing through a second of said three diameters of said sphere, a pair of pitch rollers pivotally mounted on said yaw base in a plane passing through the third of said three diameters of said sphere and at least one yaw roller mounted on said support and engaging said yaw base to rotate the same,
  (c) said sphere being supported on said pairs of rollers.

3. Apparatus according to claim 1,
  (a) said rollers being each formed of a plurality of articulated spiroidal segments each rotatable on a common crosshead axis thereof normal to the drive axis of the roller, a central of said segments having an opening to admit a drive shaft and hence having a limited degree of turn about said crosshead.

4. Apparatus according to claim 2,
  (a) said rollers being each formed of a plurality of articulated spiroidal segments each rotatable on a common crosshead axis thereof normal to the drive axis of the roller, a central of said segments having an opening to admit a drive shaft and hence having a limited degree of turn about said crosshead.

5. A model positioning and support apparatus having three dimensional attitude adjustment of said model, including yaw, pitch, and roll, together with invisible support of the model itself comprising:
  (a) a sphere cast of a clear transparent plastic having imbedded therein at the rotational center thereof a model to be selectively adjusted in attitude,
  (b) supporting drive means including a support, a plurality of drive rollers mounted on said support to engage the outer periphery of said sphere, drive means for driving said rollers on axes selected to rotate said sphere selectively about three diameters of the sphere, each normal to the other to provide yaw, pitch and roll movements to said sphere, and
  (c) an air suction system having an intake nozzle located between said drive rollers and adjacent the periphery of said sphere to bias said sphere upon said drive rollers.

6. Apparatus according to claim 5,
  (a) said suction system including means for adjusting the proximity of said intake nozzle to said sphere to adjustably vary the bias of said sphere on said drive rollers.

7. Apparatus according to claim 5,
  (a) said rollers being each formed of a plurality of articulated spiroidal segments each rotatable on a common crosshead axis thereof normal to the drive axis of the roller, a central of said segments having an opening to admit a drive shaft and hence having a limited degree of rotation about said crosshead.

8. Apparatus according to claim 1,
  (a) said support being C-shaped to provide adjacent the ends thereof a bottom support portion and a top biasing portion,
  (b) said drive rollers including yaw, pitch and roll rollers mounted on said bottom support portion in 120° spaced arrangement to receive said sphere,
  (c) said biasing idler roller means including a roller rotatably supported in said top biasing portion of said support,
  (d) said C-shaped support having sufficient resilience to provide a biasing force through said idler roller to said sphere in the direction of said drive rollers, and
  (e) said drive rollers each having a drive axis normal to the drive axis of each of the remaining two drive rollers.

9. A model positioning and support apparatus having three dimensional attitude adjustment of said model, including yaw, pitch, and roll, together with invisible support of the model itself comprising:
  (a) a sphere cast of a clear transparent plastic having imbedded therein at the rotational center thereof a model to be selectively adjusted in attitude,
  (b) supporting drive means including a support, a plurality of drive rollers mounted on said support to engage the outer periphery of said sphere, drive means for driving said rollers on axes selected to rotate said sphere selectively about three diameters of the sphere, each normal to the other to provide yaw, pitch and roll movements to said sphere,
  (c) said drive rollers including yaw, pitch and roll rollers mounted on said support in 120° spaced arrangement to receive said sphere,
  (d) said drive rollers each having a drive axis normal to the drive axis of each of the remaining two drive rollers, and
  (e) means for biasing said sphere against said drive rollers including a suction conduit having an intake end positioned adjacent an area of said sphere between said drive rollers and a suction source means for drawing air through said conduit.

References Cited
UNITED STATES PATENTS

| | | | |
|---|---|---|---|
| 2,205,961 | 6/1940 | Patterson et al. | 35—12 X |
| 2,289,877 | 7/1942 | Breyer | 35—12 |
| 2,336,436 | 12/1943 | Beindorf | 35—12 |
| 3,207,514 | 9/1965 | Vickery | 40—327 X |
| 3,405,462 | 10/1968 | Belva et al. | 35—46 |

JEROME SCHNALL, Primary Examiner

P. V. WILLIAMS, Assistant Examiner

U.S. Cl. X.R.

35—46; 40—325; 46—76; 352—244